: US 10,284,739 B2
(45) Date of Patent: May 7, 2019

(54) IMAGE FORMING APPARATUS WITH USER DETECTION AND WARM-UP CONTROL, AND CONTROL METHOD OF THE SAME

(71) Applicants: KABUSHIKI KAISHA TOSHIBA, Tokyo (JP); TOSHIBA TEC KABUSHIKI KAISHA, Tokyo (JP)

(72) Inventor: Kuniyoshi Takano, Kanagawa (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 15/674,036

(22) Filed: Aug. 10, 2017

(65) Prior Publication Data

US 2018/0255196 A1 Sep. 6, 2018

(30) Foreign Application Priority Data

Mar. 2, 2017 (JP) ................................. 2017-039859

(51) Int. Cl.
*H04N 1/00* (2006.01)
*G03G 21/02* (2006.01)
*G03G 15/00* (2006.01)
*G03G 15/20* (2006.01)

(52) U.S. Cl.
CPC ....... *H04N 1/00925* (2013.01); *G03G 15/205* (2013.01); *G03G 15/5091* (2013.01); *G03G 21/02* (2013.01); *H04N 1/00251* (2013.01); *H04N 1/00336* (2013.01); *H04N 1/00832* (2013.01); *G03G 15/5066* (2013.01); *G03G 2215/00092* (2013.01); *G03G 2215/00101* (2013.01); *H04N 2201/0094* (2013.01)

(58) Field of Classification Search
CPC ........... H04N 1/00925; H04N 1/00251; H04N 1/00336; H04N 1/00832; H04N 2201/0094; G03G 15/205; G03G 15/5091; G03G 21/02; G03G 15/5066; G03G 2215/00092; G03G 2215/00101
See application file for complete search history.

(56) References Cited

U.S. PATENT DOCUMENTS

2014/0240748 A1* 8/2014 Ohno .................... G06F 3/1273
358/1.14
2016/0142575 A1* 5/2016 Yokoyama ......... H04N 1/00896
358/1.15

FOREIGN PATENT DOCUMENTS

JP 2012-177796 A 9/2012

* cited by examiner

*Primary Examiner* — David M. Gray
*Assistant Examiner* — Laura Roth
(74) *Attorney, Agent, or Firm* — Foley & Lardner LLP

(57) ABSTRACT

An image forming apparatus includes a detection section, an identification section, an acquisition section and a restriction section. The detection section detects an approach of a user. The identification section identifies the user detected by the detection section. The acquisition section acquires statistics determined from a use count of the user identified by the identification section. The restriction section restricts execution of a warm-up control based on the statistics acquired by the acquisition section.

8 Claims, 4 Drawing Sheets

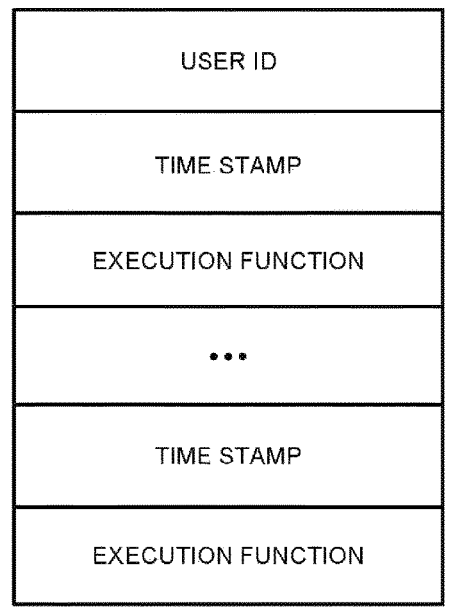

IMAGE FORMING APPARATUS WITH USER DETECTION AND WARM-UP CONTROL, AND CONTROL METHOD OF THE SAME

CROSS-REFERENCE TO RELATED APPLICATION

This application is based upon and claims the benefit of priority from Japanese Patent Application No. 2017-039859, filed Mar. 2, 2017, the entire contents of which are incorporated herein by reference.

FIELD

Embodiments described herein relate generally to an image forming apparatus and a control method of the same.

BACKGROUND

There is an image forming apparatus which releases a sleep state and executes a warm-up control if detecting an approach of a user. According to such an image forming apparatus, as compared with a case of not executing the warm-up control, it is possible to execute printing and the like early.

On the other hand, even if the user approaches the image forming apparatus, there is a case in which the user who is close to the image forming apparatus does not use the image forming apparatus. In this case, wasteful power is consumed due to the execution of the warm-up control.

DESCRIPTION OF THE DRAWINGS

FIG. 3 is a diagram illustrating user facial image data according to an embodiment;

FIG. 4 is a diagram illustrating log data according to an embodiment;

FIG. 5 is a diagram illustrating statistical data according to an embodiment.

DETAILED DESCRIPTION

In accordance with an embodiment, an image forming apparatus comprises a detection section, an identification section, an acquisition section and a restriction section. The detection section detects approach of a user (an object). The identification section identifies the user detected by the detection section. The acquisition section acquires statistics determined from use count of the user identified by the identification section. The restriction section restricts execution of a warm-up control based on the statistics acquired by the acquisition section.

Hereinafter, an image forming apparatus of an embodiment is described in detail.

Figure 1:
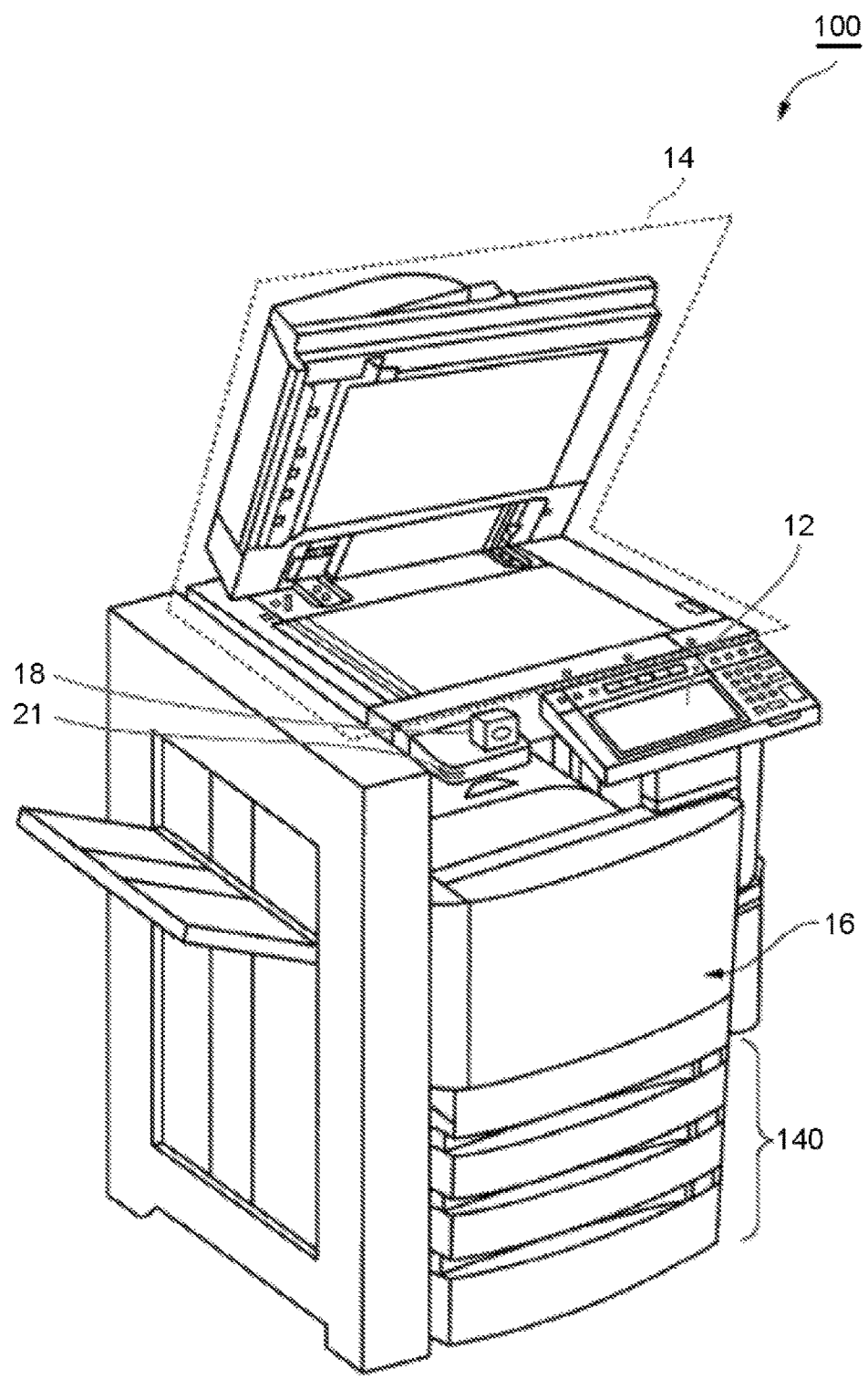
FIG. 1 is an external view exemplifying an image forming apparatus according to an embodiment.

FIG. 1 is an external view exemplifying an image forming apparatus 100 according to the embodiment. The image forming apparatus 100 of the embodiment is, for example, a multi-function peripheral, and has a copy function, a printer function, a scanner function, and a fax function. The image forming apparatus 100 can operate both in a sleep state and in a normal state. Power consumption in the sleep state is less than that in the normal state.

The image forming apparatus 100 comprises a control panel 12, a scanner 14, a printer 16, a camera 18, a human sensor 21, a sheet housing section 140, and a system controller 1.

The printer 16 forms an image on a sheet using a developing agent such as toner. The sheet is, for example, a paper or a label paper. The sheet may be an optional object as long as the image forming apparatus 100 can form an image on a surface thereof.

The scanner 14 reads image information which is a reading object as the density of light. The scanner 14 records the read image information in a main memory 4 of the system controller. The recorded image information may be transmitted to another information processing apparatus via a network. The recorded image information may be formed on the sheet by the printer 16.

The control panel 12 includes a display and a plurality of buttons. The display is an image display device such as a liquid crystal display, an organic EL (Electro Luminescence) display and the like. A touch panel is provided on the display. The display displays various information relating to the image forming apparatus 100. The control panel 12 receives an operation by a user.

The human sensor 21 detects approach of the user. In the present embodiment, a pyroelectric infrared sensor is used as the human sensor 21. A detection range of the human sensor 21 is within a circle with a radius of 2-3 meters centering on the image forming apparatus 100. The human sensor 21 detects that a user enters the detection range. The camera 18 captures an image of the user. The image forming apparatus 100 can identify the user with a face of the user captured by the camera 18. An identifiable range is within a circle with a radius of 1-2 meters centering on the image forming apparatus 100.

The sheet housing section 140 houses sheets used for image formation by the printer 16.

The printer 16 forms an image on the sheet based on image information generated by the scanner 14 or image information received via a communication path. The printer 16 forms an image by the following processing, for example. An image forming section of the printer 16 forms an electrostatic latent image on a photoconductive drum based on the image information. The image forming section of the printer 16 forms a visible image by attaching a developing agent to the electrostatic latent image. A transfer section of the printer 16 transfers the visible image onto the sheet. A fixing section of the printer fixes the visible image on the sheet by heating and pressurizing the sheet. The sheet on which an image is formed may be a sheet housed in the sheet housing section 140 or may be a manually fed sheet.

In the sleep state described above, power is not supplied to the fixing section. If returning from the sleep state to the normal state, the image forming apparatus 100 executes the warm-up control for supplying the power to the fixing section. The functions requiring the control for supplying the power to the fixing section are the copy function and the printer function.

In addition, the warm-up control includes, for example, a processing of stirring the toner, a processing for returning a reading section of the scanner to origin, a processing of causing the display of the control panel 12 to display and the like. The "warm-up control" in at least one embodiment may include various processing operations executed before returning from the sleep state to the normal state. The "warm-up control" may be a control for executing all the above various processing or a control for executing a part of various processing.

Figure 2:
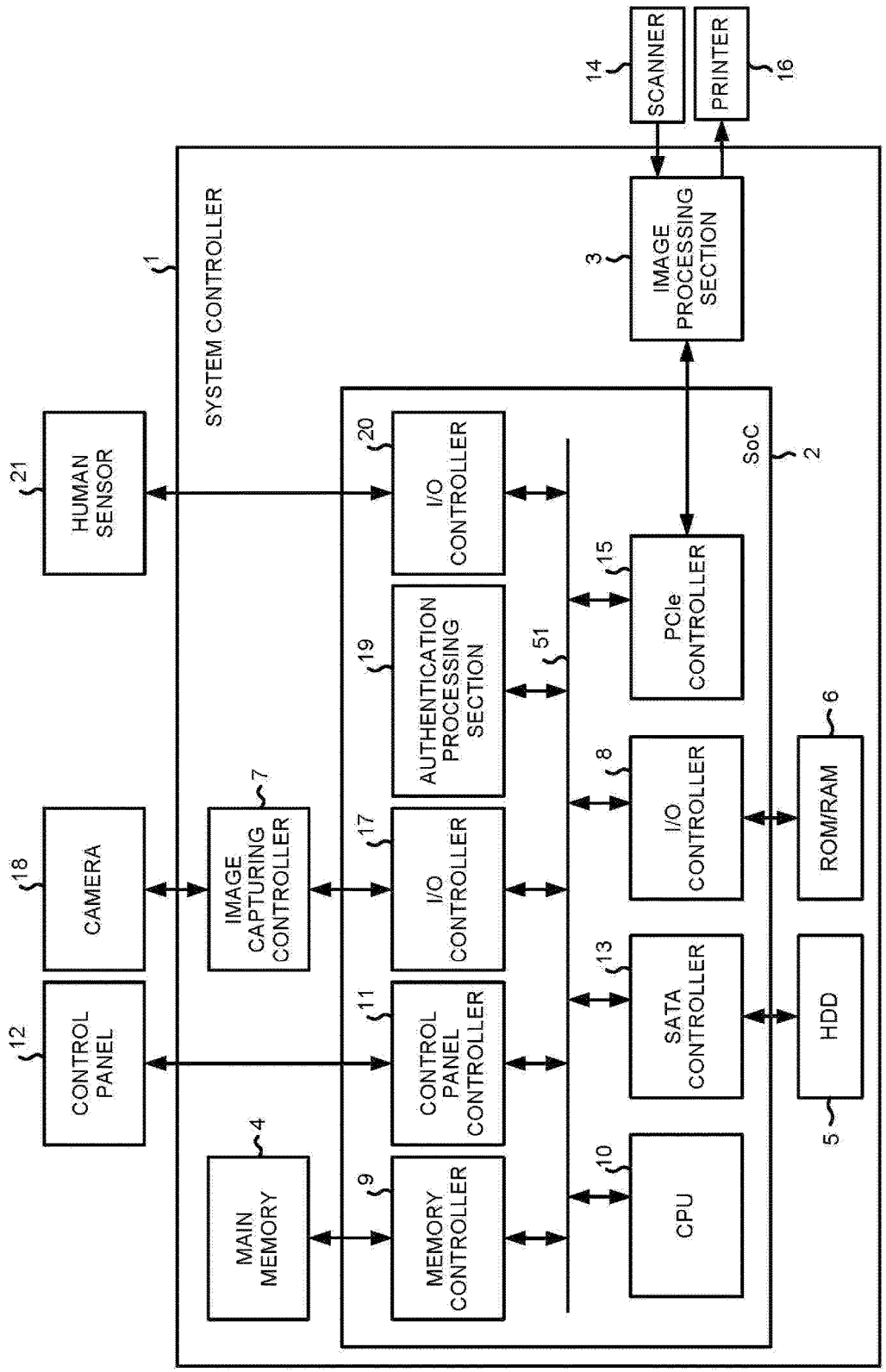
FIG. 2 is a block diagram illustrating a system controller according to an embodiment.

FIG. 2 is a block diagram illustrating a system controller which is a control system of the image forming apparatus 100 according to an embodiment. In FIG. 2, the system controller 1 includes a system LSI 2, an image processing section 3, a main memory 4, an HDD 5, a ROM/RAM 6, and an image capturing controller 7. The system controller 1 is connected to the control panel 12, the camera 18, the human sensor 21, the scanner 14 and the printer 16.

The system LSI 2 is a chip (integrated circuit) such as a SoC (System On Chip). The system LSI 2 includes an internal bus line 51 capable of executing high-speed communication. A memory controller 9, a CPU 10, a control panel controller 11, and an SATA (Serial Advanced Technology Attachment) controller 13 are connected to the bus line 51. Further, I/O controllers 8, 17 and 20, a PCIe (Peripheral Component Interconnect Express) controller 15 and an authentication processing section 19 are also connected to the bus line 51.

The CPU 10 controls operation of the image forming apparatus 100. Specifically, the CPU 10 is provided with a control program stored in the ROM/RAM 6 resident in the main memory 4, and controls each section based on a content of the program. The memory controller 9 controls reading of the resident program from the main memory 4, storage of image data in the main memory 4, and reading of the image data from the main memory 4 according to instructions from the CPU 10. The main memory 4 has an area capable of storing image information for a plurality of pages, and can store the image information from the scanner 14 for each page, for example.

The SATA controller 13 connects the system LSI 2 and the HDD 5. The HDD 5 compresses the image data read by the scanner 14 to store the image data. The I/O controller 8 connects the system LSI 2 and the ROM/RAM 6. The ROM 6 stores a control program and the like. The RAM 6 temporarily stores data.

The PCIe controller 15 connects the system LSI 2 and the image processing section 3. The image processing section 3 executes a compression processing on the image data output from the scanner 14. The image processing section 3 executes a processing such as decompression of the image data to output the image data to the printer 16.

The control panel controller 11 connects the system LSI 2 and the control panel 12. The control panel controller 11 controls the control panel 12 according to an instruction from the CPU 10. The control panel controller 11 includes an I/O controller and an LCD controller. The control panel controller 11 displays various information on the control panel 12 and outputs an operation content by the user to the CPU 10.

The I/O controller 17 connects the system LSI 2 and the image capturing controller 7. The image capturing controller 7 is connected to the camera 18. The image capturing controller 7 controls the camera 18. Specifically, the image capturing controller 7 instructs the camera 18 to capture a face of the user who approaches the image forming apparatus according to an instruction from the CPU 10. Captured face data indicating the captured face of the user is stored in the main memory 4 via the I/O controller 17 or the like.

The authentication processing section 19 executes face recognition. Specifically, the authentication processing section 19 extracts features of the face from the captured face data stored in the main memory 4, and retrieves a face having matching features in a facial image database described below. If the face having the matching features is registered in the facial image database, the authentication processing section 19 acquires a user ID of the captured user. The acquired user ID is output to the CPU 10.

The I/O controller 20 connects the system LSI 2 and the human sensor 21. If the approach of the user is detected, the human sensor 21 outputs to the CPU 10 that the user approaches. In other words, if detecting that the user enters the detection range of the human sensor 21, the human sensor 21 outputs the detection result to the CPU 10.

In the construction described above, a process until the user is identified is as follows. First, if the human sensor 21 detects the approach of the user, the camera 18 starts to capture images. Next, the image capturing controller 7 acquires the captured face data. The authentication processing section 19 acquires the user ID of the captured user from the acquired captured face data.

FIG. 3 is a diagram illustrating the user facial image data. The user facial image data includes the user ID and the facial image data. The facial image data is data indicating the features of the face of the user identified by the user ID. Since the user ID and the facial image data correspond to each other in the user facial image data, the authentication processing section 19 can acquire the user ID from the facial image data having the matching features. The facial image database stores the user facial image data of the registered user. The facial image database is stored in the HDD 5.

FIG. 4 is a diagram illustrating log data. The log data is provided for each user ID. The log data is composed of the user ID, time stamps, and an execution function. Among them, the time stamp and the execution function are additionally written each time the image forming apparatus 100 is used. For example, if the copy function is used at 3:30:25 afternoon on Apr. 1, 2017, data indicating (20170401153025, copy) is additionally written. A log database stores the log data of the registered user. The log database is stored in the HDD 5.

Based on the log data, statistics determined from the use count of the user are acquired. The statistics in at least one embodiment may include an average value of the use count calculated in a predetermined period. The average value is described specifically with reference to FIG. 5.

FIG. 5 is a diagram illustrating statistical data generated based on the log data in FIG. 4. The statistical data is provided for each user ID. The statistical data shown in FIG. 5 shows an average value of the use count of the image forming apparatus 100 by the user in the morning and the afternoon from Monday to Friday. Herein, the use count is the number of times the copy function, the printer function, the scanner function, and the facsimile function described above are used. In other words, the use count means the number of times the user executes jobs. The above-mentioned periods from Monday morning to Friday afternoon are examples of the predetermined period, respectively. Moreover, the predetermined period may include Saturday and Sunday, or may be any period such as from 9 o'clock in the morning to 5 o'clock in the afternoon. In the present embodiment, a value obtained by converting the calculated average value to an integer is used as the average value. As a method for converting the average value to an integer, there is a method of calculating an average value and then converting it to an integer using a floor function or a ceiling function.

The statistical data is created at the time of user registration. The average value in the statistical data created at the time of user registration is initialized with a maximum value. For example, if the average value is 2-byte data, it is initialized with 65535 (=0xFFFF). This is because the image forming apparatus is used by the user initially in a state without limit of the number of times substantially to obtain an accurate average value.

In the present embodiment, the statistical data is updated every month, for example. Therefore, the statistical data shows the average use count of previous month. A statistical database stores the statistical data of the registered user. The statistical database is stored in the HDD 5.

Figure 6:
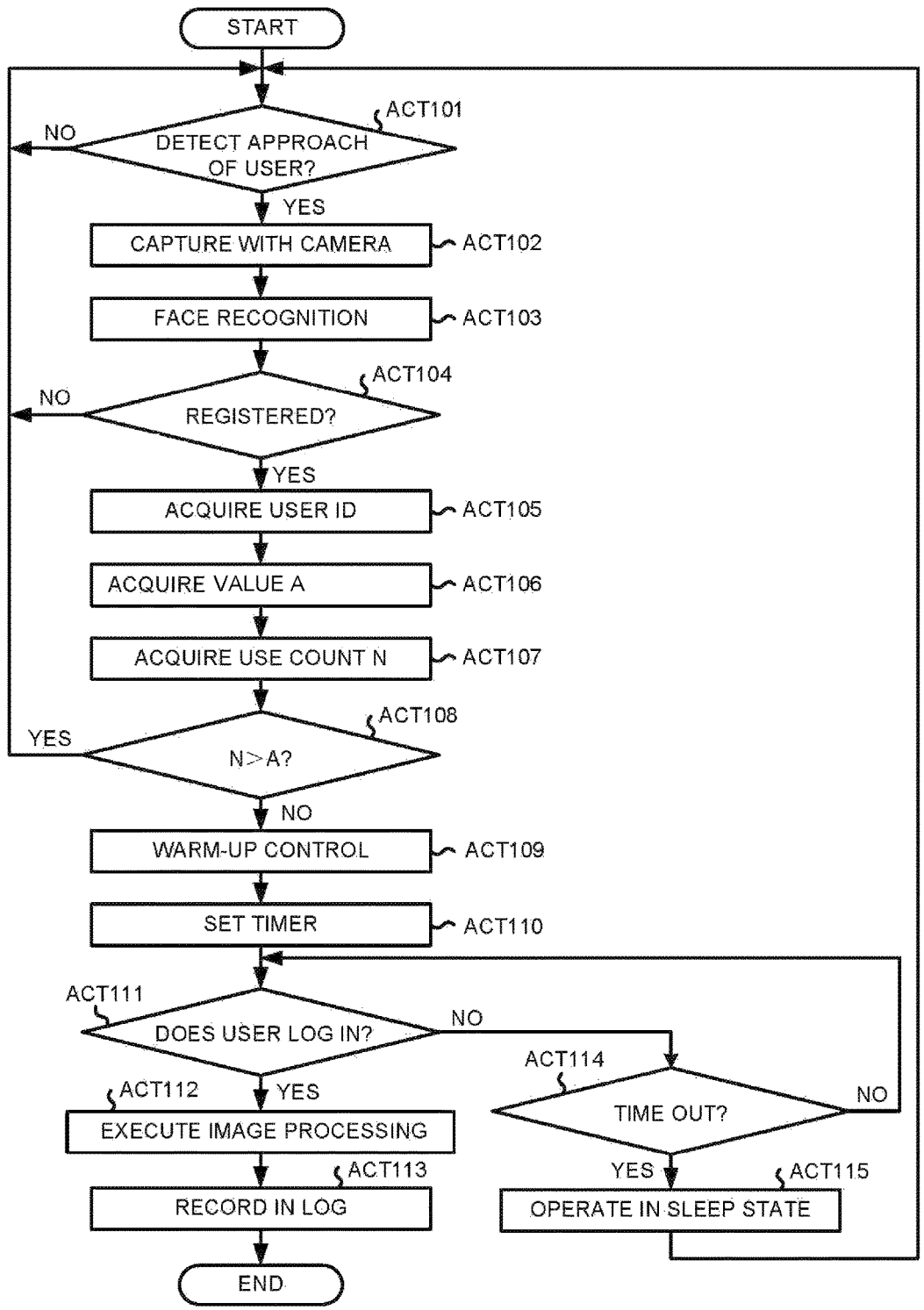
FIG. 6 is a flowchart illustrating restriction processing according to an embodiment.

Next, a restriction processing that restricts the execution of the warm-up control is described. FIG. 6 is a flowchart illustrating the flow of the restriction processing. The restriction processing is executed at the time the image forming apparatus 100 operates in the sleep state.

If the human sensor 21 detects the approach of the user (Yes in ACT 101), the image capturing controller 7 captures the face of the user with the camera 18 (ACT 102). Thus, the captured face data described above is obtained. The authentication processing section 19 executes the face recognition (ACT 103). The authentication processing section 19 determines whether or not the user is registered as a result of retrieving the facial image database (ACT 104). If the user is not registered (No in ACT 104), the processing in ACT 101 is executed again.

If the user is registered (Yes in ACT 104), the authentication processing section 19 acquires the user ID (ACT 105). The acquired user ID is output to the CPU 10. The CPU 10 retrieves information of the user ID in the statistical database to acquire an average value A of the use count of the corresponding period which is a period corresponding to the present day of the week and time (ACT 106). For example, if the current date and time is 11 o'clock in the morning on Tuesday, the average value in Tuesday morning is acquired.

The CPU 10 acquires a use count N in the corresponding period (ACT 107). Specifically, the CPU 10 acquires the log data corresponding to the user ID from the log database. Next, the CPU 10 counts the number of logs indicating the functions executed during the corresponding period in the log data. The value obtained by the count is the use count in the corresponding period. For example, if the current date and time is 11 o'clock in the morning on Tuesday, the CPU 10 counts the number of logs indicating the executed functions in the log data at the time stamp after 0 o'clock on Tuesday and before 11 o'clock in the morning on Tuesday.

The CPU 10 determines whether or not the use count N exceeds the average value A (ACT 108). If the use count N exceeds the average value A (Yes in ACT 108), the processing in ACT 101 is executed again. As described above, in the present embodiment, if the use count in the predetermined period exceeds the average value, the execution of the warm-up control is restricted.

If the use count N is smaller than the average value A (Yes in ACT 108), the CPU 10 executes the warm-up control (ACT 109). The CPU 10 sets a timer (ACT 110). The timer is used for switching again to the sleep state if the user does not log in. The login method is a method of inputting a user ID and a password, but the login method may be any method as long as it can be used to authenticate a user.

The CPU 10 determines whether or not the user logs in (ACT 111). If the user logs in (Yes in ACT 111), the CPU 10 executes an image processing specified by the user (ACT 112). The image processing is a processing corresponding to a designated function among the copy function, the printer function, the scanner function and the facsimile function. The CPU 10 records the time stamp and the executed function in the log data (ACT 113) and ends the present processing. At the time of termination, the image forming apparatus 100 operates in the normal state. Thereafter, if the image forming apparatus 100 operates in the sleep state again, the restriction processing is executed.

If the user does not log in (No in ACT 111), the CPU 10 determines whether or not the timer set in ACT 111 becomes time out (ACT 114). If the timer does not become the time out (No in ACT 114), the processing in ACT 111 is executed again. If the timer becomes the time out (Yes in ACT 114), the CPU 10 operates in the sleep state (ACT 115).

From the above, whether to execute the warm-up control is determined based on the comparison between the use count N and the average value A if the human sensor 21 detects the approach of the user. As a result, it is possible to suppress the execution of the warm-up control uniformly even in a case in which the user approaches the image forming apparatus and the human sensor 21 detects the approach and recognizes the user with the camera. Therefore, it is possible to suppress execution of the warm-up control caused by a user having a low possibility of using the image forming apparatus even if approaching the image forming apparatus. As a result, according to the image forming apparatus 100 of the present embodiment, it is possible to suppress the power consumption as compared with a case in which the warm-up control is executed uniformly if the approach of the user is detected.

Modification 1

In the embodiment described above, the human sensor 21 detects the approach of the user, and identifies the user by executing face authentication with the camera 18. On the other hand, it is also possible to identify the user only with the camera 18. Specifically, the camera 18 constantly captures images and detects the approach of the user, and whether the user approaches can be determined based on the size of the user being captured as a subject. Thereafter, the captured face data is obtained by capturing the face by the camera 18. Hereinafter, the authentication processing section 19 executes the same processing as in the present embodiment, and thus the user can be identified. According to modification 1, the cost of the human sensor can be reduced.

Modification 2

It is also possible to identify a user by using RFID (Radio Frequency Identifier) instead of the human sensor or the camera. Conventionally, identifying a user by using a non-contact IC card using RFID is executed, but the RFID applied to the present embodiment is an RFID that can communicate at a distance of several meters. By sending a user ID in the tag of the RFID to the image forming apparatus, it is possible to identify the user as the image forming apparatus can detect the approach of the user and acquire the user ID. According to modification 2, the cost of the human sensor and camera can be reduced.

Modification 3

A server (which may be a server on a cloud) storing the above image database, the statistical database and the log database may be provided, and the image forming apparatus may be configured to communicate with the server. In such a structure, the image forming apparatus includes the human sensor and the camera in the same manner as in the above embodiment. The image forming apparatus sends the log data to the server each time the user uses the image forming apparatus.

In modification 3, if the image forming apparatus detects the approach of the user and acquires the captured face data, the captured face data is transmitted to the server. The server receiving the captured face data executes the processing in ACT 103 to ACT 108. If NO is taken in ACT 104 or NO is taken in ACT 108, the server notifies the image forming apparatus that the warm-up control is unnecessary. On the other hand, if YES is taken in ACT 108, the server notifies the image forming apparatus that the warm-up control is required. The image forming apparatus operates according to a notification from the server. According to modification 3, the image forming apparatus can reduce the cost and resource use of the image forming apparatus as an area for storing each database is unnecessary.

Modification 4-1

Modification 4-1 and modification 4-2 described later are examples in which modification 3 is applied to a plurality of image forming apparatuses. Modification 4-1 restricts the execution of the warm-up control depending on the use count of all of multiple image forming apparatuses by the user. In modification 4-1, if the average value of the use count of a user is, for example, 3, even if the use count of one of the image forming apparatuses exceeds the average value, even if the sum of the use count of a plurality of different image forming apparatuses exceeds the average value, from the next time, the execution of the warm-up control is restricted in any of the image forming apparatuses. According to modification 4-1, even if the user uses a plurality of the image forming apparatuses, the execution of the warm-up control is restricted for each user, and thus power consumption can be suppressed.

Modification 4-2

Modification 4-2 restricts the execution of the warm-up control depending on the number of times each user uses the image forming apparatus for each of the plurality of the image forming apparatuses. Therefore, in modification 4-2, a user average value is determined for each of the image forming apparatuses. For example, for a user, the average value is set to 10 for the image forming apparatus A, and the average value is set to 20 for the image forming apparatus B. Therefore, if the use count of the image forming apparatus A exceeds the average value, the execution of the warm-up control is restricted in the image forming apparatus A from the next time, but the execution of the warm-up control in the image forming apparatus B is not restricted. According to modification 4-2, if the use count of the user is determined for each of the plurality of the image forming apparatuses to some extent, the power consumption can be suppressed without impairing the convenience of the user.

Modification 5

In the above embodiment, the value A is the average value which is used as the statistic determined from the use count of the user, but the maximum value or the minimum value may be used. Furthermore, variance and standard deviation may be used as the value A. For example, if variance or standard deviation exceeds a predetermined criterion, since the variation is large, the execution of the warm-up control may be restricted at the number of times larger than the average value. In this way, it is possible to absorb the variation of the use count, and thus the convenience of the user can be secured.

In the above embodiment, the use count is the number of times the copy function, the printer function, the scanner function and the facsimile function are used, but this is not limited thereto. For example, the use count may be the number of times the fixing section consuming a relatively large amount of power is used. In the case of the present embodiment, since the functions of using the fixing section are the copy function and the printer function, the use count may be the number of times the copy function and the printer function are used.

The above-described embodiment does not simply restrict the execution of the warm-up control, but restricts the execution of the warm-up control based on the statistics acquired for each user. Accordingly, according to the present embodiment, it is possible to ensure both the convenience of the user and suppression of power consumption.

According to the image forming apparatus 100 of the embodiment described above, it is possible to provide the image forming apparatus capable of suppressing the power consumption.

The functions of the image forming apparatus according to the foregoing embodiments may be realized by a computer. In this case, programs for realizing the functions are recorded in a computer-readable recording medium and the programs recorded in the recording medium may be read into a computer system to be executed. Further, it is assumed that the "computer system" described herein contains an OS or hardware such as peripheral devices. Further, the "computer-readable recording medium" refers to a portable medium such as a flexible disc, a magneto-optical disk, a ROM, a CD-ROM and the like or a storage device such as a hard disk built in the computer system. Furthermore, the "computer-readable recording medium" may include a medium for dynamically holding programs for a short time (akin to a communication wire) in a case in which the programs are sent via a communication line such as a network like the Internet or a telephone line, and a medium which holds the programs for a certain time such as a volatile memory in a computer system serving as a server and a client. The foregoing programs may realize a part of the above-mentioned functions, and furthermore, the foregoing programs may be realized by the combination of the above-mentioned functions with the programs already recorded in the computer.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
   a detection section configured to detect an approach of a user;
   an identification section configured to identify the user detected by the detection section;
   an acquisition section configured to acquire statistics determined from a use count of the user identified by the identification section; and a restriction section configured to restrict execution of a warm-up control based on the statistics acquired by the acquisition section, wherein the statistics include an average value of the use count calculated in a predetermined period, and wherein the restriction section is configured to restrict execution of the warm-up control when the use count in the predetermined period exceeds the average value.

2. The image forming apparatus according to claim 1, wherein the identification section is configured to identify the user by recognizing a face of the user captured by an image capturing section.

3. The image forming apparatus according to claim 1, further comprising:

a printer configured to cause an image formed on a sheet to be fixed to the sheet, wherein the use count is the number of times the printer is used.

4. A method of controlling at least one image forming apparatus, including:

detecting an approach of a user;

identifying the detected user;

acquiring statistics determined from a use count of the identified user; and restricting execution of a warm-up control based on the acquired statistics, wherein restricting execution of the warm-up control comprises restricting the execution of the warm-up control when a standard deviation of the use count exceeds a predetermined criterion.

5. The method of claim 4, wherein the use count is determined based on usage of a plurality of image forming apparatuses.

6. The method of claim 4, further comprising:

executing the warm-up control after identifying the user.

7. The method of claim 5, further comprising:

communicating the statistics to the plurality of image forming apparatuses via a cloud network.

8. A system, comprising:

a multifunction device;

a sensor configured to detect a subject and determine a distance between the multifunction device and the subject; and a controller configured to identify the subject detected by the sensor; and control timing of an operation of the multifunction device based at least on subject-specific data acquired by the controller, wherein the subject-specific data comprise statistics including an average value of a use count of the subject calculated in a predetermined period, and wherein the controller is configured to restrict execution of a warm-up control of the multifunction device when the use count in the predetermined period exceeds the average value.

* * * * *